May 6, 1930.                F. G. WITHROW                1,757,280
                             REAR VIEW MIRROR
                            Filed June 20, 1927

Inventor
Floyd G. Withrow
By Frank E. Liverance,
Attorney

Patented May 6, 1930

1,757,280

UNITED STATES PATENT OFFICE

FLOYD G. WITHROW, OF GRAND RAPIDS, MICHIGAN

REAR-VIEW MIRROR

Application filed June 20, 1927. Serial No. 199,875.

This invention relates to a rear view mirror and, particularly, to a novel support therefor and method of attaching the same to the body of an automobile. Rear view mirrors attached to and projecting to one side of the body of a motor vehicle as a rule are very hard to install, especially on closed bodies. It is usually necessary to drill holes through metal parts and use bolts or screws for the attachment of the brackets which support such mirrors. It is very desirable that a rear view mirror be had at the driver's side of a motor vehicle so that not only may the driver know of the approach of a vehicle from behind but may also see the same when it turns out to pass at the left and note its progress as it is passing. The ordinary rear view mirror in a closed body located above the wind shield at the front of and slightly to the right of a driver gives a view through the back window of the body of vehicles so long as they are behind but gives no view of those at the side.

My invention is directed to a very simple, easily and readily installed mirror which is located at the driver's side of the vehicle and extends outwardly a short distance therefrom so that a view is had, not only of vehicles to the rear but those which have pulled out to pass on the left, the view being clear until the vehicle is substantially even with the one on which the mirror is installed. This rear view mirror may be installed almost instantly without the use of skilled labor. In addition the mirror may be equipped with an auxiliary mirror to reflect into the first or main mirror. An overhead traffic light many times is obstructed when a vehicle is driven too far ahead so that the taffic light cannot be seen by the driver by reason of the interposition of the front part of the top of the vehicle between it and the driver and this auxiliary mirror is of value in such cases.

Various other objects and purposes than those stated will appear as an understanding of the invention is had from the following description taken in connection with the accompanying drawing, in which, Fig. 1 is a perspective view illustrating the mirror applied to a closed body of an automobile, a fragmentary portion of the body only being shown.

Like reference characters refer to like parts in the different figures of the drawing.

Figure 1:
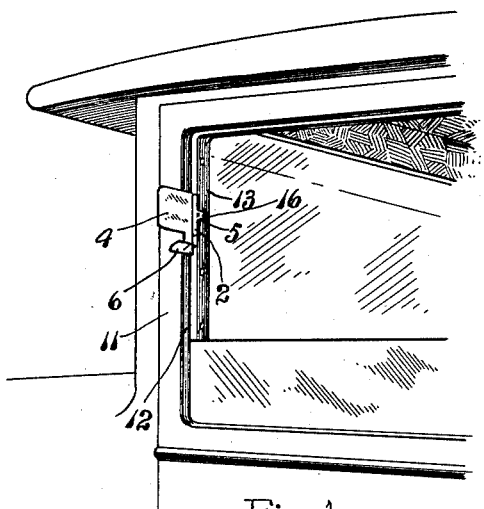
Figure 2:
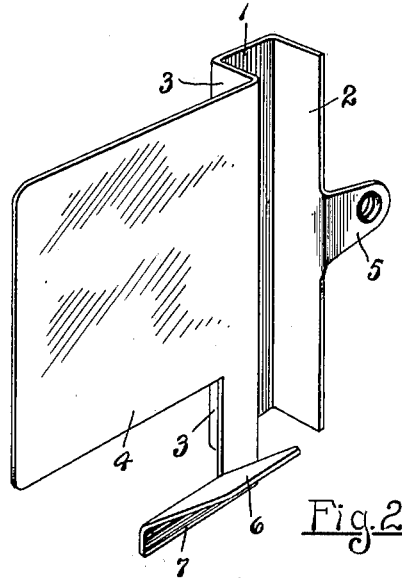
Fig. 2 is a perspective view of the mirror and its support.
Figure 3:
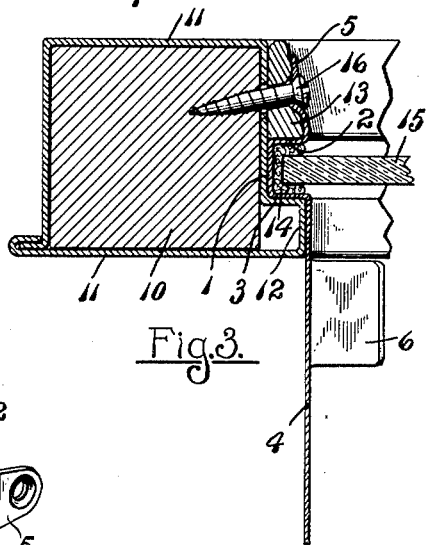
Fig. 3 is an enlarged horizontal section through the mirror showing the same applied to a motor vehicle.

In the construction shown, particularly in Figs. 1, 2 and 3, a vertical channel of sheet metal is provided having a web 1 and two spaced apart flanges 2 and 3 extending at right angles from the web. Integral with the flange 3 and turned outwardly at right angles therefrom is a metal member 4 which may be given a mirror surface at its rear side while from the free edge of the flange 2 an ear 5 projects in the opposite direction.

The construction described is complete in itself and will serve as a mirror and a bracket support therefor for attachment to a vehicle. However, there may be added to it an angularly positioned reflector 6 located below the mirror part 4 and extending upwardly and to the rear therefrom bent from the vertical continuation 7 of the mirror part 4, the reflecting member 6 being cut at its upper and inner edges from the metal plate 4 and turned to the rear as shown in Figs. 1, 2 and 3. The angular reflector 6 is thus so located that it will reflect an overhead traffic light on to the vertical reflector 4 where it may be seen by the driver when the light itself is obscured by the vehicle top and visor.

Figure 5:
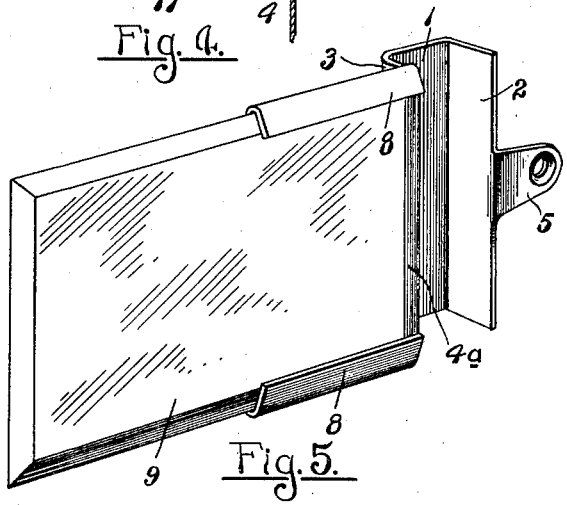
Fig. 5 is a perspective view similar to Fig. 2, showing the modification in construction of the mirror, the supporting part being the same.

Instead of having the mirror sides made upon the rear side of the plate 4, said plate 4 may be the full height of the channel, as indicated at 4ª in Fig. 5, extend outwardly at right angles therefrom and be equipped at its upper and lower edges with flanges 8 turned toward each other and shaped so as to grip the upper and lower edges of a glass mirror 9. Flanges 8 may extend the full length of the glass mirror 9 as well as a part of the length as shown.

In a closed body for motor vehicles the glass at the side of the driver is mounted for vertical movement in suitable guides back of the front post of the door at the left of the driver. This post 10 is covered with a sheet metal covering 11 which, at the rear side of the post and near its outer edge, is made into a guide 12 as shown, while spaced from the guide 12 is a strip 13 fastened to the post 10 at its rear side whereby a vertical groove or rabbet is made in which a channel shaped felt 14 is seated, the front edge of the glass 15 being received between the flanges of the felt channel. Of course the rear edge of the glass 15 is guided in a similar manner and the upper edge is received in a felt channel seated in a similar groove at the upper edge of the opening in the front door of the vehicle at the left of the driver.

The installation of the mirror of my invention is accomplished by merely pulling out the felt channel 14 at the proper place and inserting the metal channel of the mirror support underneath it with the ear 5 extending over the strip 13 and the mirror part 4 extending outwardly and to the left. The felt guide channel 14 seats in the channel of the mirror support as is fully shown in Fig. 3. Then by passing a screw 16 through the ear 5 and into the post 10 the installation is complete and the mirror is installed in position for use.

Figure 4:
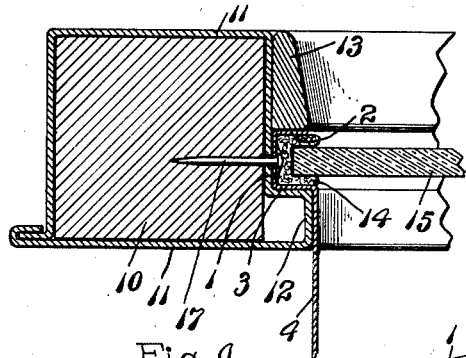
Fig. 4 is a view similar to Fig. 3, showing a slight modification in the manner that the mirror is attached to the automobile body.

In Fig. 4 the construction shown in Fig. 3 is modified to the extent that the ear 5 is left off and the installation is completed by driving securing brads 17 through the web 1 of the channel into the post 10. There are of course many other simple ways of fastening this channel of a mirror support in place.

The construction described while very simple and economical to produce is also exceptionally easy to install and may be applied to the body of a closed car in a very short time. There is no necessity of drilling holes through metal nor is skilled labor required for the installation. The invention is defined in the appended claim and is to be considered comprehensive of all forms of structure coming within their scope.

I claim:

The combination with a window casing having a groove and a window having its edge mounted into said groove, of an integral member having a portion lying within said groove beneath the edge of said window and a portion extending outside of said grove, said outer portion having a vertical reflection surface and an inclined reflecting surface located below and to the rear of the vertical reflecting surface and extending angularly upward and rearwardly from its lower edge.

In testimony whereof I affix my signature.

FLOYD G. WITHROW.